United States Patent
Böhm et al.

(10) Patent No.: US 11,507,196 B2
(45) Date of Patent: Nov. 22, 2022

(54) METHOD AND DEVICE FOR CONTROLLING DISPLAY CONTENT ON AN OUTPUT MEANS OF A VEHICLE

(71) Applicant: DAIMLER AG, Stuttgart (DE)

(72) Inventors: Manuel Böhm, Holzgerlingen (DE); Gerd Gulde, Ammerbuch (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/284,027

(22) PCT Filed: Sep. 27, 2019

(86) PCT No.: PCT/EP2019/076261
§ 371 (c)(1),
(2) Date: Apr. 9, 2021

(87) PCT Pub. No.: WO2020/074280
PCT Pub. Date: Apr. 16, 2020

(65) Prior Publication Data
US 2021/0333885 A1    Oct. 28, 2021

(30) Foreign Application Priority Data

Oct. 11, 2018   (DE) ..................... 10 2018 008 045.6

(51) Int. Cl.
*G06F 3/01*   (2006.01)
*B60K 35/00*   (2006.01)

(52) U.S. Cl.
CPC .............. *G06F 3/017* (2013.01); *B60K 35/00* (2013.01); *B60K 2370/146* (2019.05);
(Continued)

(58) Field of Classification Search
CPC ... G06F 3/017; B60K 35/00; B60K 2370/146; B60K 2370/166; B60K 2370/175;
(Continued)

(56) References Cited

U.S. PATENT DOCUMENTS 8,290,480 B2 * 10/2012 Abramson .......... H04W 12/082
455/418
9,800,716 B2 * 10/2017 Abramson .............. H04W 4/48
(Continued)

FOREIGN PATENT DOCUMENTS

DE    19802594 A1   7/1999
DE   102009050056 A1   5/2011
(Continued)

OTHER PUBLICATIONS

International Search Report dated Dec. 13, 2019 in related/corresponding International Application No. PCT/EP2019/076261.
(Continued)

*Primary Examiner* — Grant Sitta
(74) *Attorney, Agent, or Firm* — Patent Portfolio Builders PLLC

(57) ABSTRACT

Content on a display of a vehicle is controlled based on a degree of automation of a driving state of the vehicle and at least one further state variable of the vehicle or of a passenger.

18 Claims, 2 Drawing Sheets

Figure 1:
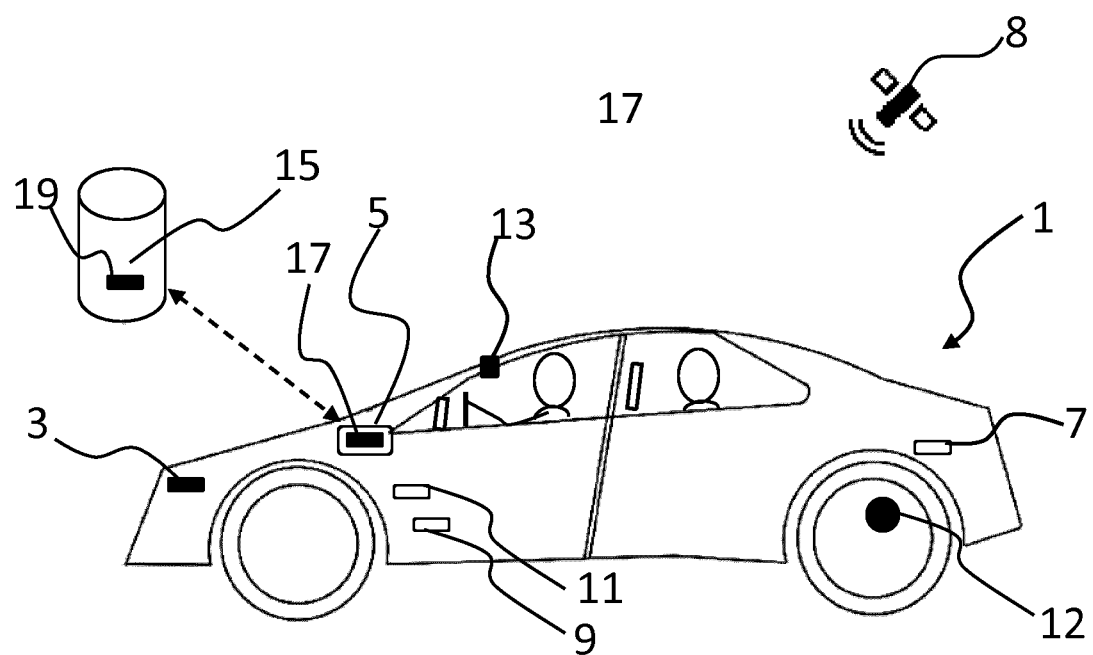

(52) U.S. Cl.
CPC .. *B60K 2370/166* (2019.05); *B60K 2370/175* (2019.05); *B60K 2370/52* (2019.05); *B60K 2370/73* (2019.05)

(58) Field of Classification Search
CPC ............ B60K 2370/52; B60K 2370/73; B60K 2370/1529; B60K 2370/182; B60K 2370/186; B60K 2370/195; B60K 37/06; B60W 2050/146; B60W 2540/221; B60W 2556/50; B60W 50/14

See application file for complete search history.

(56) References Cited

U.S. PATENT DOCUMENTS

| | | | | |
|---|---|---|---|---|
| 10,081,372 | B2* | 9/2018 | Iguchi | B60W 50/14 |
| 10,144,289 | B2* | 12/2018 | Lee | B60K 37/06 |
| 10,417,910 | B2* | 9/2019 | Scofield | H04W 4/42 |
| 10,667,088 | B2* | 5/2020 | Cordova | H04W 4/38 |
| 10,686,929 | B2* | 6/2020 | Cohen | H04M 1/6075 |
| 10,752,172 | B2* | 8/2020 | Daman | G06V 20/597 |
| 10,819,793 | B2* | 10/2020 | Rose | H04L 41/0806 |
| 10,882,400 | B2* | 1/2021 | Gaffar | B60K 37/06 |
| 10,948,920 | B2* | 3/2021 | Adams | G05D 1/0225 |
| 10,956,759 | B1* | 3/2021 | Pertsel | B60R 21/01552 |
| 11,040,619 | B1* | 6/2021 | Martin | B60W 50/14 |
| 11,070,661 | B2* | 7/2021 | Abramson | H04M 1/72463 |
| 2005/0023899 | A1* | 2/2005 | Kitazawa | B60R 11/0235 307/10.1 |
| 2013/0150004 | A1* | 6/2013 | Rosen | H04M 3/42357 455/418 |
| 2014/0121903 | A1* | 5/2014 | Lee | B60K 35/00 701/41 |
| 2014/0309875 | A1* | 10/2014 | Ricci | G08B 21/18 701/36 |
| 2015/0112512 | A1* | 4/2015 | Fan | B60G 17/02 701/1 |
| 2015/0283902 | A1* | 10/2015 | Tuukkanen | G06T 19/006 340/461 |
| 2016/0171322 | A1* | 6/2016 | Gunaratne | A61B 5/163 348/148 |
| 2016/0272112 | A1* | 9/2016 | DeGrazia | B60Q 9/00 |
| 2017/0077633 | A1* | 3/2017 | Hricik | H01R 13/2414 |
| 2017/0271799 | A1* | 9/2017 | Axelowitz | G06F 1/1613 |
| 2017/0289346 | A1* | 10/2017 | Suzuki | H04M 1/72463 |
| 2018/0052458 | A1* | 2/2018 | Tsuji | B60W 30/143 |
| 2019/0012910 | A1* | 1/2019 | Kuffner, Jr. | G08G 1/096775 |
| 2019/0047584 | A1* | 2/2019 | Donnelly | B60W 30/025 |
| 2019/0225232 | A1* | 7/2019 | Blau | B60W 50/082 |
| 2019/0267732 | A1* | 8/2019 | Buck | H01R 12/59 |
| 2019/0384292 | A1* | 12/2019 | Aragon | B60W 40/09 |
| 2020/0215917 | A1* | 7/2020 | Schöning | B60W 50/14 |
| 2020/0317216 | A1* | 10/2020 | Konrardy | B60W 30/182 |
| 2020/0384913 | A1* | 12/2020 | Nobuhara | B60Q 1/0035 |
| 2021/0105901 | A1* | 4/2021 | Jang | H05K 3/361 |

FOREIGN PATENT DOCUMENTS

| | | |
|---|---|---|
| DE | 102014214078 A1 | 1/2016 |
| DE | 102016015401 A1 | 7/2017 |
| DE | 102017006646 A1 | 3/2018 |
| DE | 102017217603 B3 | 3/2019 |
| WO | 2018168527 A1 | 9/2018 |

OTHER PUBLICATIONS

Written Opinion dated Dec. 13, 2019 in related/corresponding International Application No. PCT/EP2019/076261.

* cited by examiner

METHOD AND DEVICE FOR CONTROLLING DISPLAY CONTENT ON AN OUTPUT MEANS OF A VEHICLE

BACKGROUND AND SUMMARY OF THE INVENTION

Exemplary embodiments of the present invention relate to a method and a device for controlling display content on an output means of a vehicle.

A method for outputting information on output means of a vehicle is known from DE 10 2009 050 056 A1, wherein different display content is approved depending on the degree of automation comprising an assisted, highly automated or autonomous driving.

It is disadvantageous that further influencing factors in connection with the degree of automation are not taken into account for the control of display content.

Accordingly, exemplary embodiments of the present invention are directed to an improved method and an improved device for controlling display content on a screen of a vehicle.

In the method according to the invention, at least one further state variable of the vehicle or of a passenger is detected and display content on the output means is determined depending on the degree of automation and the at least one further state variable. The method makes it possible in an advantageous manner to adjust the display content in a targeted manner by taking into account conditions that influence the attention of the vehicle passengers, in particular the driver. By way of example, in partially or fully automated driving, greater distraction of the driver by secondary activity can in principle by permitted than in manual driving. Furthermore, due to a physical condition of the driver or difficult weather conditions, the secondary activity can be further reduced according to the invention by limiting approvals of the display content on an output means and the attention can be increased according to the situation. In the present context, restriction of approvals is also to be understood to mean blocking of content. If, for example, only the display of texts is approved on a screen, then films are blocked accordingly. Furthermore, it can be individually taken into account which persons in the vehicle are allowed to see which content and on which output media which display content can be seen.

According to one embodiment of the present invention, the state variables comprise, in addition to the vehicle state, current geodata of the vehicle, in particular an identification of a country travelled through by the vehicle. The vehicle surroundings encompassed by the geodata are determined, for example, by means of a map and the current geo-position of the vehicle. Advantageously, the inclusion of geodata enables display content to be output depending on geographic conditions. Using the vehicle position described by GPS data and a map, the geodata of a vehicle defining a country currently being driven through by the vehicle can be determined. The provisions for display content applicable to each country depending on the automation level of a driving operation are stored in a control unit. The display content for different degrees of automation can thus be automatically adjusted depending on the country being driven through, in particular depending on the legal regulations of the country. Similarly, the geodata can be used to determine geographical conditions, such as narrow lanes, bends, construction sites or junctions that require a driver's increased attention. Accordingly, attention is increased by adapting the scope of approved display content to the geodata, i.e., to the geographic conditions at the current vehicle location.

According to a further embodiment of the present invention, the state variables include a driver, a front passenger or other passengers as users of the output means. Display content is approved depending on the person interacting with the output means. The user of an output means is determined on the basis of sight tracking and/or gesture tracking means know from the prior art. Advantageously, different display content can be approved depending on who interacts with a display by viewing and/or gestures. If, for example, the driver interacts with the head unit display, then first display content is approved, whereas if only the front passenger interacts with the same display, second display content is approved. Accordingly, the information about who interacts with an output unit can be used to control the display content for several output units independently of one another.

According to a further embodiment of the present invention, the vehicle state comprises a driving situation, in particular a critical driving situation. The critical driving situation can be determined, for example, by intervention of an assistance system or sensors such as speed, acceleration or yaw rate sensors. If the speed, acceleration and/or yaw rate exceeds a predefined threshold value or if an assistance system intervenes to stabilize the vehicle, then display content on various displays means are approved individually depending on the degree of automation. The approval of display content on output units when driving with different degrees of automation can be advantageously adapted to critical driving situations.

According to a further embodiment of the present invention, the driver state comprises a current condition of the driver. The driving condition of the driver is determined by means of methods known in the prior art for pulse monitoring, eye monitoring, etc. In an advantageous manner, the approval of display content can be adapted to the current driver state, for example during partially or fully automated driving.

According to a further embodiment, the vehicle comprises a plurality of output means, wherein the determination of approved display content is performed individually for a plurality of output means. The output means in the vehicle comprise screens, mobile devices, a head-up display, a projector or a hologram. The display content is approved depending on the output means that can be selected for an output. With different output means arranged in the vehicle, the individual scope of the display content can be approved for each of the output means depending on the degree of automation of the driving operation. By way of example, a driver can view several displays, i.e., the instrument cluster, the display of a head unit arranged next to the instrument cluster, the display of a head-up display and, if necessary, another screen which can be viewed by the driver and the front passenger. In a partially autonomous driving mode, for example, the method advantageously allows no distracting content but only driving information to be displayed on the instrument cluster, texts to be displayed on the head unit display, information about the surroundings to be displayed on the head-up display, and films to be displayed on the additional screen.

The device has means for determining a degree of automation of a driving state of the vehicle, as well as a control unit that approves display content that can be displayed on the output means depending on the degree of automation. According to the invention, the control unit approves display content that can be displayed on the output means depending on the degree of automation and at least one further state variable which is detected by sensors and comprises geodata of the vehicle, a user of the output means, a driving situation and/or a driver state. With the aid of the device, in addition to the degree of automation, further influences are taken into account for determining the scope of display content to be approved, and driver concentration on the driving situation is ensured.

According to one embodiment of the device, the vehicle comprises several output means on each of which the control unit approves individual display content. The device makes it possible to approve display content individually on each output means depending on the degree of automation and depending on other status variables of the vehicle, the driver or a passenger. By way of example, in a manual driving mode, only driving data such as speed or navigation data is approved on the screens that can be viewed by a driver, while films are approved on the screens of the front passengers or the passengers in the rear. With a switch to the fully autonomous driving mode, films can also be approved on the screens assigned to the driver.

According to a further embodiment, the allocation of the degree of automation and the further state variable with the display content to be approved on the one or more display means is stored in a parameter set of the control unit. A parameter set is understood to be a data set that can be changed for updating by suitable means in the control unit. For this purpose, the parameter set is stored in a flash memory and can be overwritten by a new parameter set at any time.

According to one embodiment, the parameters can be synchronized with a parameter set that is stored on a server and can be changed. By way of example, in the event of frequent changes to legal requirements in different countries, data synchronization with a server can be used to keep a vehicle fleet up to date without any time delay. In this case, the parameter set on the server is changed according to current requirements and synchronized with the memory units of the control unit of target vehicles.

Further advantages, features and details emerge from the following description, in which—if necessary with reference to the drawing—at least one exemplary embodiment is described in detail. Described and/or pictorially depicted features can form the subject matter of the invention on their own or in any reasonable combination, if necessary also independently of the claims, and can in particular additionally also be the subject matter of one or more separate application(s). Identical, similar and/or functionally identical parts are provided with identical reference numerals.

BRIEF DESCRIPTION OF THE DRAWING FIGURES

Figure 2:
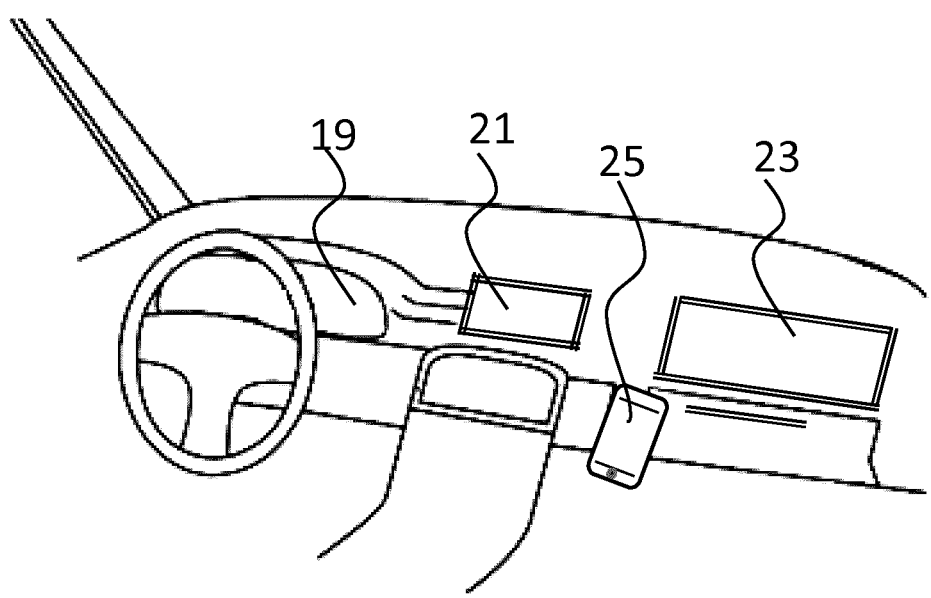

Here are shown:

FIG. 1 a schematic side view of a vehicle having a device for carrying out the method according to the invention;

FIG. 2 a schematic view of the interior of the vehicle from FIG. 1 and

Figure 3:
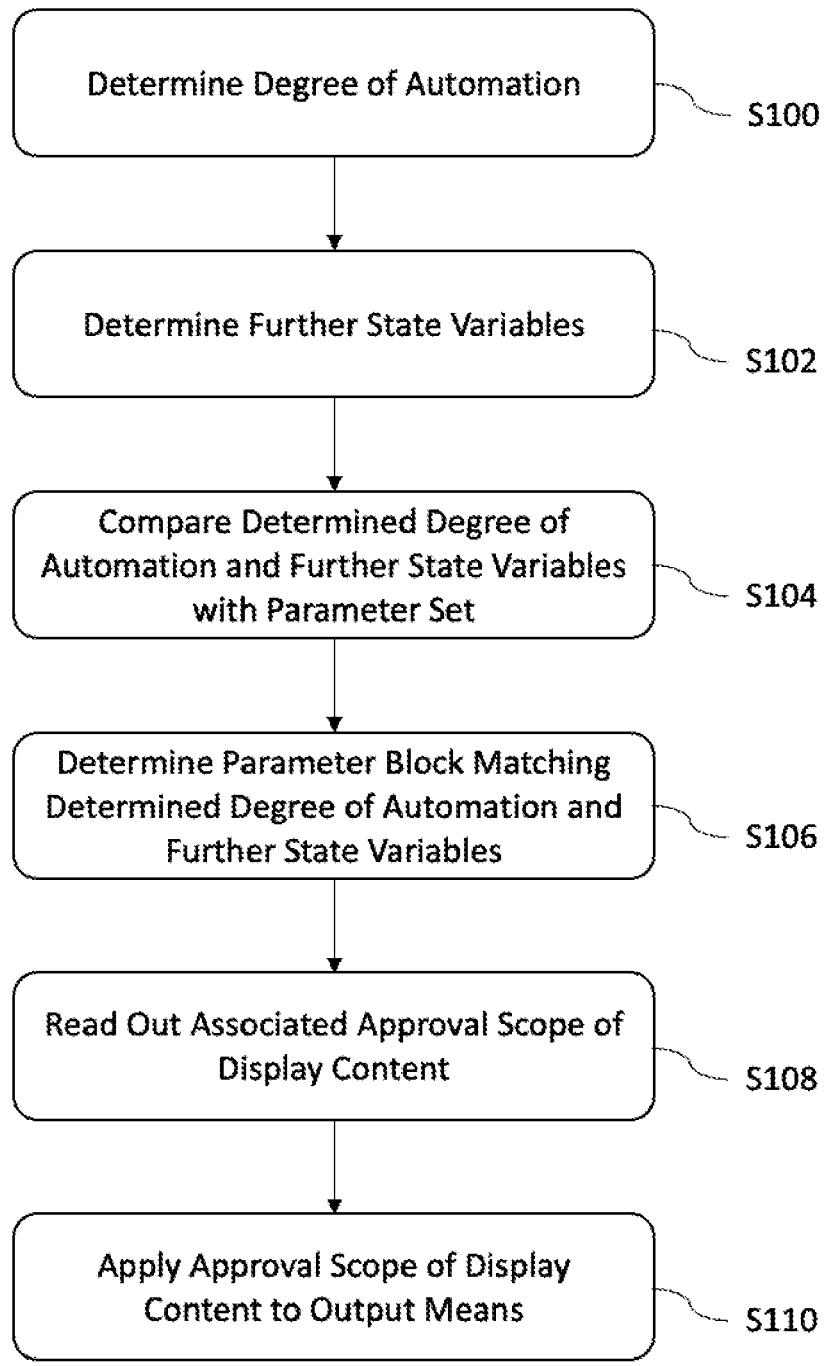

FIG. 3 a flow diagram of a process sequence.

DETAILED DESCRIPTION

The vehicle 1 depicted in FIG. 1 comprises means 3 for determining the degree of automation of a driving operation. Depending on the degree of automation, the vehicle 1 drives manually controlled by a driver, partially automated in various stages or fully automated without the intervention of a driver.

In a control unit 5 arranged in the vehicle 1, parameters are stored in a parameter set 17, the parameters comprising various degrees of automation that can be executed by the vehicle 1. Furthermore, parameters are stored which define further state variables such as geodata, a user of the output means, a driving situation or a current condition of the driver. The degree of automation with the further parameters forms a parameter block which defines display content approved for output means of the vehicle 1 in each case.

An exemplary parameter block defines that:
a. for the head unit to reproduce display content,
b. during an automated driving operation,
c. when driving in Italy,
d. when the driver is looking at the head unit display,
e. in a driving situation that can be described as normal without the intervention of an assistance system, and
f. if the driver is in a good current condition watching films is approved as a secondary activity of the driver.

The scope of the parameter blocks can be defined as desired, i.e., in an alternative, simplified embodiment, a parameter block can, for example, only comprise the parameters a, b, c. The parameters in the parameter blocks can be adapted as desired and stored in the control unit 5, i.e., for example, legal requirements in different countries can be depicted via the parameters and updated to new regulations if necessary. A parameter set 17 stored in the control unit 5 comprises numerous parameter blocks for the individual definition of display content to be approved on various display means depending on various states of the vehicle or the passengers.

The display content to be approved relates, for example, to films, animations, vehicle data, texts, images, control menus, etc. It can of course also be the case that no display content is approved, such that a screen is locked to a certain extent.

The parameter set 17 stored in the control unit 5 is synchronized with a parameter set 19 stored on a server 15 continuously or on request. There is a permanent or at least temporarily active communication link established between the vehicle 1 and the server 15 via a communication module not depicted. A change in the parameter set 19 on the server 15 is transmitted to the control unit 5 by synchronization with the vehicle 1. Accordingly, the transmission is also made to an entire fleet of vehicles. In an alternative method, the parameter set 17 can be updated manually in a workshop using a device set up for communication with the control unit.

If the state variables of the vehicle 1 and/or of a passenger detected by sensors match the state variables defined in a parameter block, then the display content assigned to a display means in the parameter block are approved accordingly.

In the vehicle, in addition to the degree of automation, the other state variables of the vehicle or of a passenger are determined by means of sensors described in more detail below.

To determine the geodata of the vehicle, data from satellites 8 is received by means of a sensor comprising a GPS receiver 7, and a geo-position of the vehicle 1 is determined. In conjunction with a map, which is not depicted, geodata of the vehicle can be determined from the geo-position. By way of example, the geodata includes a designation of a country travelled through by the vehicle 1, a motorway travelled on, a street travelled on in a city. In addition, the geodata can include that the vehicle is travelling on a winding road, in a mountainous area, or in an area with specific traffic regulations etc.

The vehicle state further comprises information about a driving situation, for example, current weather conditions determined by sensors such as a rain sensor and a temperature sensor. Sensors for determining the driving situation also include, for example, sensors 12 of assistance systems for detecting critical traffic situations, for example, speed sensors of an EPS system.

The driver's condition is also determined by sensors, for example sensors 11 for pulse measurement or a camera.

A user of the output means is determined by sensors such as the camera 13. By way of example, the camera 13 determines whether a driver or front passenger is interacting with a centrally located screen, the instrument cluster or another screen.

In FIG. 2, an interior of the vehicle 1 is shown having various output means. The output means comprise an instrument cluster 19, a head unit display 21, a front passenger display 23 and a display 25 of a smartphone. By means of the parameter set 17 comprising various parameter blocks, the approved display content is determined individually on each of the output means 19, 21, 23, 25 via the control unit 5.

By way of example, a parameter block comprises the following parameters and defines that:
a. for the mobile device to reproduce display content,
b. during a manual driving operation,
c. when driving in Germany,
d. when the front passenger is looking at the mobile device display,
e. in a driving situation that can be described as normal without the intervention of an assistance system, and
f. if the driver is in a good current condition watching films on the mobile device is allowed, i.e., approved, for the front passenger.

If it is determined that state variables of the vehicle and/or of the driver or another passenger determined by sensors match the values of the parameters of the parameter block, then watching films is accordingly approved for the front passenger by the control unit 5 on the mobile device 25. As soon as a passenger requests a film in this situation, it is also shown accordingly on the mobile device.

However, as soon as the driver directs his gaze towards the mobile device 25, the determined state variables of the vehicle and/or driver would no longer match with the previously described parameter block. If a driver directs his gaze towards the mobile device, then state variables of the vehicle and/or driver would match another parameter block. The matching parameter block would then, under d, correspondingly have the definition "when the driver looks at the display of the mobile device 25" compared to the aforementioned parameter block and, for example, the definition that no display content are approved on the mobile device 25. Accordingly, the control unit 5 blocks the output of any display content on the mobile device.

In another parameter block, it is defined, for example, that:
a. the display of the head unit 21 to reproduce display content,
b. during a fully automated driving operation,
c. when driving in Germany,
d. when the driver is looking at the display of the head unit 21,
e. in a driving situation that can be described as normal without the intervention of an assistance system, and
f. if the driver is in a good current condition watching films is approved for the driver.

As soon as the vehicle crosses country borders, another parameter block becomes relevant, which lists a different country under parameter c. If watching films is not permitted in the other country, then watching films is not approved, i.e., is blocked, for the parameter block. When crossing from Germany to the other country, the vehicle recognizes the new country by means of GPS receiver and a map, the corresponding parameter block comprising the new country is applied, the scope of the approval of display content assigned to the parameter block is read out and applied by the control unit 5 to the corresponding output means, i.e., the display of the head unit 21.

The flow diagram according to FIG. 3 reproduces the method according to the invention. In step S100, a degree of automation of the driving state of the vehicle 1 is determined. In addition to the degree of automation, further state variables of the vehicle and/or a passenger are determined in step S102. The state variables determined in S102 comprise geodata of the vehicle. Alternatively, or additionally, the further state variables comprise a user of one of the output means, a driving situation or a condition of a passenger, i.e., preferably of the driver.

In step S104, the detected degree of automation and the detected further state variables are compared with a parameter set 17 stored in the memory unit 5.

In step S106, a parameter block is determined from the parameter set 17 that matches the determined degree of automation and the further state variables. In step S108, an associated approval scope of the display content is read out from the parameter block for the output means 19, 21, 23, 25 which can be selected by a user. The approval scope is applied to the selected output means 19, 21, 23, 25 in S110. By way of example, the control unit 5 communicates to the output means 19, 21, 23, 15 which display content are approved and may be displayed.

Although the invention has been further illustrated and explained in detail by preferred exemplary embodiments, the invention is not limited by the disclosed examples, and other variations can be derived therefrom by those skilled in the art without leaving the scope of protection of the invention. It is therefore clear that a plurality of variation possibilities exists. It is also clear that embodiments mentioned as examples really only represent examples, which are not to be understood in any way as limiting, for example, the scope of protection, the possible applications or the configuration of the invention. Rather, the preceding description and the figure description enable the person skilled in the art to implement the exemplary embodiments in a concrete manner, wherein the person skilled in the art, being aware of the disclosed idea of the invention, can make a variety of changes, for example with respect to the function or the arrangement of individual elements mentioned in an exemplary embodiment, without leaving the scope of protection which is defined by the claims and their legal equivalents, such as further explanations in the description.

The invention claimed is:

1. A method for controlling display content on a plurality of output means of a vehicle, the method comprising:
   determining a degree of automation of a driving state of the vehicle;
   determining geodata of the vehicle comprising an identification of a country travelled through by the vehicle;
   determining, by detecting pulse or eye monitoring, a current physical condition of a driver of the vehicle;

determining whether the driver or a front passenger of the vehicle interacts with the output means by viewing or gestures;

individually determining approved display content for each of the plurality of output means depending on the degree of automation, the geodata of the vehicle comprising an identification of a country travelled through by the vehicle, the current physical condition of the driver, and whether the driver or front passenger of the vehicle interacts with the output means by viewing or gestures.

2. The method of claim 1, wherein the individual determination of approved display content for each of the plurality of output means is further based on at whether driver, a front passenger or further passengers are users of the output means of the plurality of output means.

3. The method of claim 1, wherein individual determination of approved display content for each of the plurality of output means is further based on a driving situation.

4. The method of claim 1, wherein the individual determination of approved display content for each of the plurality of output means is further based on weather conditions.

5. The method of claim 1, wherein the individual determination of approved display content for each of the plurality of output means is further based on weather conditions.

6. The method of claim 1, further comprising:
determining, based on the geodata of the vehicle, geographic conditions requiring the driver's attention, wherein the individual determination of approved display content for each of the plurality of output means is further based on the geographic conditions requiring the driver's attention.

7. The method of claim 1, wherein the approved display content for one of the plurality of display means is different depending on whether the driver or the front passenger interacts with the one of the plurality of display means by the viewing or the gestures.

8. The method of claim 1, wherein the plurality of display means includes an instrument cluster, a head unit display, a heads-up display, and an additional screen, wherein when the degree of automation is a partially autonomous driving mode, the approved display content for the instrument cluster is only driving information, the approved content for the head unit display includes texts, the approved content for the heads-up display includes information about surroundings of the vehicle, and the approved content for the additional screen includes films.

9. The method of claim 1, wherein the individual determination of the approved display content is based on at least one parameter block stored in a memory of the vehicle.

10. The method of claim 9, wherein the at least one parameter block stored in the memory of the vehicle is synchronized with a server.

11. The method of claim 1, wherein, based on the at least one parameter block, the individual determination of approved content for one of the plurality of output means allows the display of content when the driver is not interacting with the one of the plurality of output means and blocks the display content when the driver is interacting with the one of the plurality of output means.

12. A method for a vehicle comprising a plurality of displays, the method comprising:
receiving a degree of automation of a vehicle;
receiving geodata of the vehicle, wherein the geodata comprise an identification of a country travelled through by the vehicle;
receiving information regarding whether a driver of the vehicle or a front passenger of the vehicle interacts with one of the plurality of displays by viewing or gestures;
receiving a current physical condition of the driver, wherein the current physical condition of the driver is detected by pulse or eye monitoring; and
individually determining approved content for each of the plurality of displays based on the received degree of automation of the vehicle, the received geodata of the vehicle, the received information regarding whether the driver of the vehicle or the front passenger of the vehicle interacts with a display by viewing or gestures, and the received current physical condition of the driver.

13. The method of claim 12, further comprising:
determining, based on the geodata of the vehicle, geographic conditions requiring the driver's attention, wherein the individual determination of approved display content for each of the plurality of output means is further based on the geographic conditions requiring the driver's attention.

14. The method of claim 12, wherein the approved display content for one of the plurality of display means is different depending on whether the driver or the front passenger interacts with the one of the plurality of display means by the viewing or the gestures.

15. The method of claim 12, wherein the plurality of display means includes an instrument cluster, a head unit display, a heads-up display, and an additional screen, wherein when the degree of automation is a partially autonomous driving mode, the approved display content for the instrument cluster is only driving information, the approved content for the head unit display includes texts, the approved content for the heads-up display includes information about surroundings of the vehicle, and the approved content for the additional screen includes films.

16. The method of claim 12, wherein the individual determination of the approved display content is based on at least one parameter block stored in a memory of the vehicle.

17. The method of claim 16, wherein the at least one parameter block stored in the memory of the vehicle is synchronized with a server.

18. The method of claim 12, wherein, based on the at least one parameter block, the individual determination of approved content for one of the plurality of output means allows the display of content when the driver is not interacting with the one of the plurality of output means and blocks the display content when the driver is interacting with the one of the plurality of output means.

* * * * *